United States Patent
Foster et al.

(10) Patent No.: US 6,493,678 B1
(45) Date of Patent: Dec. 10, 2002

(54) METHOD, APPARATUS AND SYSTEM FOR MERCHANDISING RELATED APPLICATIONS

(75) Inventors: William G. Foster, New York, NY (US); Christos Tselebis, Lexington, KY (US)

(73) Assignee: Connectrix Systems, Inc., New York, NY (US)

( * ) Notice: Subject to any disclaimer, the term of this patent is extended or adjusted under 35 U.S.C. 154(b) by 0 days.

(21) Appl. No.: 09/083,933

(22) Filed: May 22, 1998

(51) Int. Cl.[7] .............................................. G06F 17/60
(52) U.S. Cl. ........................................ 705/28; 705/29
(58) Field of Search .............................. 705/27, 1, 100, 705/28, 29; 707/10, 103, 2, 3, 100–104

(56) References Cited

U.S. PATENT DOCUMENTS

| | | | |
|---|---|---|---|
| 4,369,359 A | | 1/1983 | Mendoza ................... 235/89 R |
| 4,703,423 A | * | 10/1987 | Bado et al. ..................... 705/1 |
| 4,992,940 A | * | 2/1991 | Dworkin ....................... 705/26 |
| 5,191,522 A | | 3/1993 | Bosco et al. ................. 364/401 |
| 5,237,496 A | * | 8/1993 | Kagami et al. ............... 705/28 |
| 5,282,273 A | | 1/1994 | Ushio et al. ................. 395/325 |
| 5,291,385 A | * | 3/1994 | Abecassis ..................... 705/27 |
| 5,291,396 A | * | 3/1994 | Calcerano et al. ............. 705/1 |
| 5,299,122 A | | 3/1994 | Wang et al. ............. 364/419.1 |
| 5,334,822 A | * | 8/1994 | Sanford ........................ 705/28 |
| 5,406,477 A | | 4/1995 | Harhen ....................... 364/401 |
| 5,493,489 A | | 2/1996 | Tamaki et al. .............. 364/401 |
| 5,544,040 A | * | 8/1996 | Gerbaulet .................... 705/26 |
| 5,581,755 A | | 12/1996 | Koerber et al. ............. 395/614 |
| 5,655,118 A | | 8/1997 | Heindel et al. ............. 395/614 |
| 5,671,398 A | | 9/1997 | Neubauer ................... 395/500 |
| 5,701,472 A | | 12/1997 | Koerber et al. ............. 395/619 |
| 5,720,036 A | | 2/1998 | Garfinkle et al. ...... 395/200.06 |
| 5,740,425 A | * | 4/1998 | Povilus ....................... 705/28 |
| 5,878,400 A | * | 3/1999 | Carter, III ................... 705/20 |
| 5,970,476 A | * | 10/1999 | Fahey .......................... 705/28 |
| 6,023,683 A | * | 2/2000 | Johnson et al. ............... 705/28 |
| 6,049,742 A | * | 4/2000 | Milne et al. .................. 700/99 |
| 6,151,582 A | * | 11/2000 | Huang et al. .................. 705/8 |

FOREIGN PATENT DOCUMENTS

| | | | |
|---|---|---|---|
| EP | 0568180 A2 | * | 3/1993 |
| JP | 409062730 A | * | 3/1997 |

OTHER PUBLICATIONS

James "Automated inventory on PC: this inventory management system from Ann Arbor Computer is more than a distribution management, forecasting or modeling system"; Clinton Distribution, v88, n2, p61(2); Dialog File 148, Accession No. 03864635, Feb. 1989.*

Estep "Tailoring your MRP system to meet your needs"; ITE Solutions v28n9 PP: 36–39; Dialog File 15, Accession No. 01281837, Sep. 1996.*

Sydney "Deliver The Goods"; Manufacturing Systems, v15 n4 p80(3). Dialog File 256, Accession No. 00102791, Apr. 1997.*

* cited by examiner

*Primary Examiner*—Tariq R. Hafiz
*Assistant Examiner*—Romain Jeanty
(74) *Attorney, Agent, or Firm*—O'Melveny & Myers LLP

(57) ABSTRACT

A merchandising related method, apparatus and system which includes a product editor for providing product information for products, a classification editor to create hierarchies for the products, a distribution editor to assign distribution channels through which the products will be sold, a horizon editor to establish different time horizons for the sale of the products, and a line editor to provide line builds and produce line lists based on the information entered through the product editing means, classification editing means, distribution channel editing means, and horizon editing means. The method, apparatus and system will work across a variety of different distribution channels such as retail, wholesale, mail-order and the Internet in any number of horizons such as fiscal seasons, calendar seasons, design seasons and media seasons.

20 Claims, 8 Drawing Sheets

METHOD, APPARATUS AND SYSTEM FOR MERCHANDISING RELATED APPLICATIONS

CROSS-REFERENCE TO RELATED APPLICATIONS

Not applicable.

STATEMENTS REGARDING FEDERALLY SPONSORED RESEARCH

Not applicable.

BACKGROUND OF THE INVENTION

The present invention relates to the development of merchandise line lists and data foundation establishment for merchandising related applications for use across a variety of sales and distribution channels, such as retail, wholesale, Internet and mail order.

Recently, the dividing lines in the retail, wholesale, Internet and mail order markets have begun to overlap as retailers, manufactures and wholesalers have expanded their businesses into all facets of the marketplace. This expansion by businesses has been in response to increasing competition and a corresponding increase in the amount of more sophisticated consumers. As consumers have become more demanding, the importance of maintaining a current and ever growing and evolving supply of inventory has increased. Consequently the development of flexible merchandising systems to help track, plan and manage product lines is essential.

However, prior art merchandising systems typically are limited to single and specific sales and distribution channels. For example, a wholesaler will have systems designed to work specifically with issues like shipping, warehousing, and advertising allowance which a retailer will have systems designed for store specific issues such as allocation and distribution and details. Current consumer tastes and demands have forced businesses to diversify not only their product offerings, but also the sales distribution channels through which they take their product to market, channels such as retail, wholesale, Internet and mail order. Accordingly, these conventional applications are not well suited to the tracking, planning and managing of inventory over multiple sales and distribution channels.

Furthermore, conventional systems also suffer from the inability to spontaneously change product classifications without losing the prior sales history of the products. Furthermore, these systems are also limited as to the number of product extensions which can be used in the system (i.e., wool sweaters (regular, big and tall, petite sizes)).

Accordingly, it would be desirable to have a merchandising system which could develop merchandise line lists and establish a data foundation for merchandising related applications across a variety of sales and distribution channels.

BRIEF SUMMARY OF THE INVENTION

The invention includes a method, apparatus and system for the development of merchandise line lists, the gathering of data, and the storage of data in such a way that a foundation is established for merchandising related applications for use across a variety of sales and distribution channels, such as retail, wholesale, Internet and mail order. The invention includes a computer implemented method for use with a merchandising system which includes the steps of gathering product information for products, creating hierarchies for the products, assigning distribution channels through which the products will be sold, establishing different time horizons for the sale of the products and linking the product editing means, classification editing means, distribution channel editing means, and horizon editing means together to produce merchandise line lists.

The invention further includes an apparatus, system and computer readable medium for creating product line lists which may include a database having stored therein product data for a plurality of products, a merchandising system coupled to said database which includes a product editor for providing product information for products, a classification editor to create hierarchies for the products, a distribution channel editor means to assign distribution channels through which the products will be sold, a horizon editor to establish different time horizons for the sale of the products and a line editor means to build product line lists.

The method, apparatus and system will work across a variety of different distribution channels such as retail, wholesale, mail-order and the Internet in any number of horizons such as fiscal seasons, calendar seasons, design seasons and media seasons.

BRIEF DESCRIPTION OF THE DRAWINGS

A more complete understanding of the present invention and the attendant advantages and features thereof will be more readily understood by reference to the following detailed description, when considered in conjunction with the accompanying drawings, wherein.

DETAILED DESCRIPTION OF THE INVENTION

Figure 1:
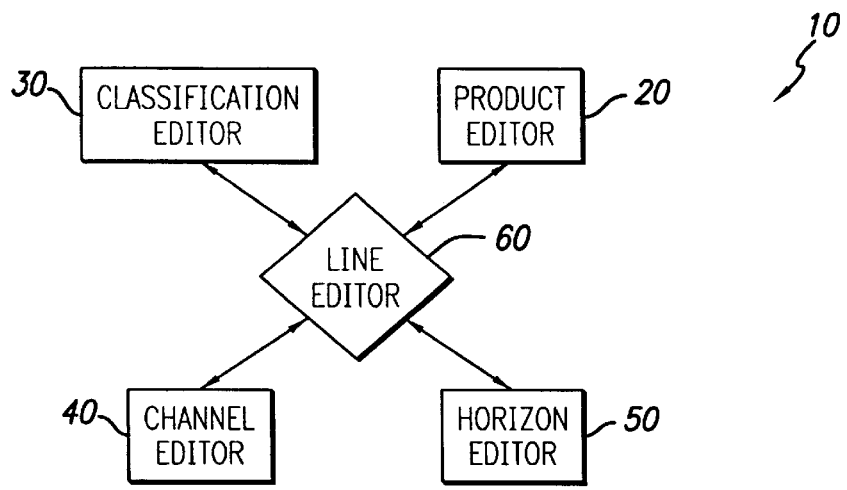
FIG. 1 is a block diagram of the merchandising system engine of the present invention.

FIG. 1 is a block diagram showing a merchandising data engine 10 in accordance with the present invention. The data engine 10 is designed for the development of merchandise line lists and data foundation establishment for merchandising related computer applications across a variety of sales and distribution channels, such as retail, wholesale, Internet and mail order.

The data engine 10 is a computer based relational software engine which includes at least one of the following: a product editor 20, a classification editor 30, a channel editor 40 and a horizon editor 50. The product editor 20, a classification editor 30, a channel editor 40 and a horizon editor 50 are all then linked to a line editor 60. Basically, the product, classification, channel and horizon editors allow the inputting and manipulation of product, classification, channel, and horizon information which is then compiled and can then be manipulated by the line editor 60 to perform product line builds and consequently, output line lists. An exemplary line list for a sample men's product line is shown below:

Mens
   Cotton Sweaters
      Crew
         7287 French Red Stripe Sweater
         7297 Varsity Crew
         7301 Raglan Crew Sweater
         10063 Vintage Crew Sweater
      Turtleneck
         7304 Split Turtle Raglan
         7305 Zip-neck Contrast Collar Sweater
   Wool Sweaters
      Crew
         7574 Handknit Pattern Crew Sweater
         7577 Heather Tweed Sweater
         7579 St. George's Cross Sweater
         7582 Progress Crew Neck Sweater
         7812 Autumn Crew neck
         7818 All Over Fair Isle
         7872 Wool/Alpaca Crew
      V-Neck
         7578 Argyle Sweater
         7811 Lamb's wool V-neck
         7839 Low V-neck Cashmere
      Turtleneck
         7585 Shaker Stitch T-necks
         7957 Progress Turtleneck
         7973 Navy Sweater As used herein, the term "product" refers to any saleable goods or merchandise that can be measured in units such as clothing, furniture, electronics, machinery, jewelry, food, electricity etc.

Figure 2A:
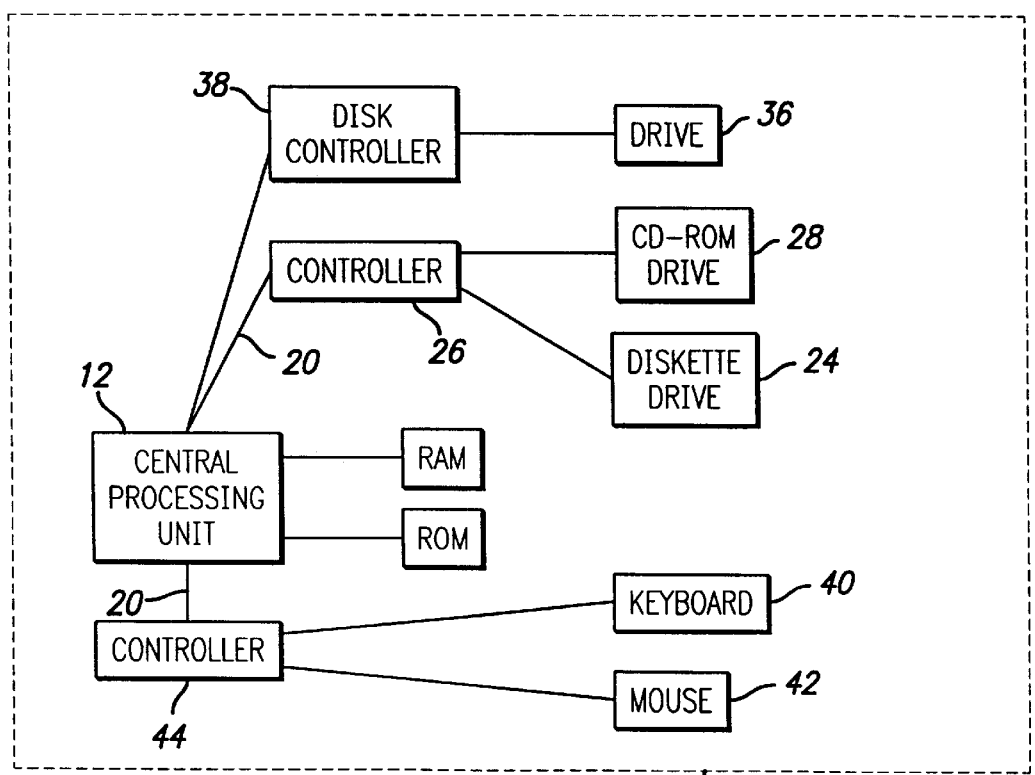
FIG. 2a is a diagramatic representation of a computer system suitable for use with the present invention.
Figure 2B:
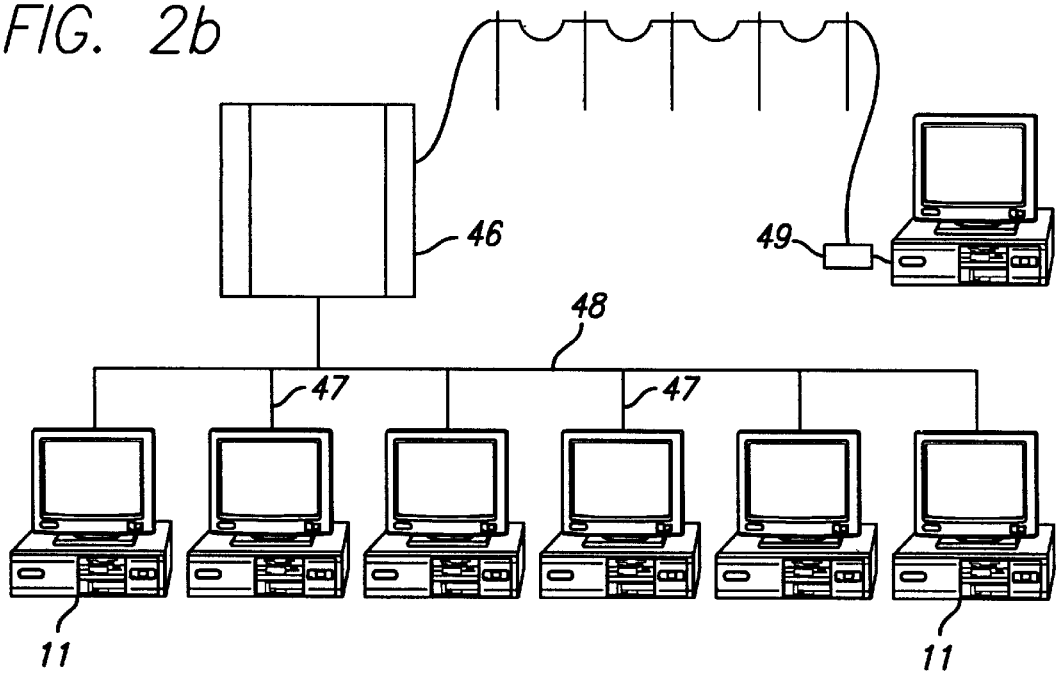
FIG. 2b is a diagramatic representation of the computer system of FIG. 2a in a client/server configuration suitable for use with the present invention.
Figure 3:
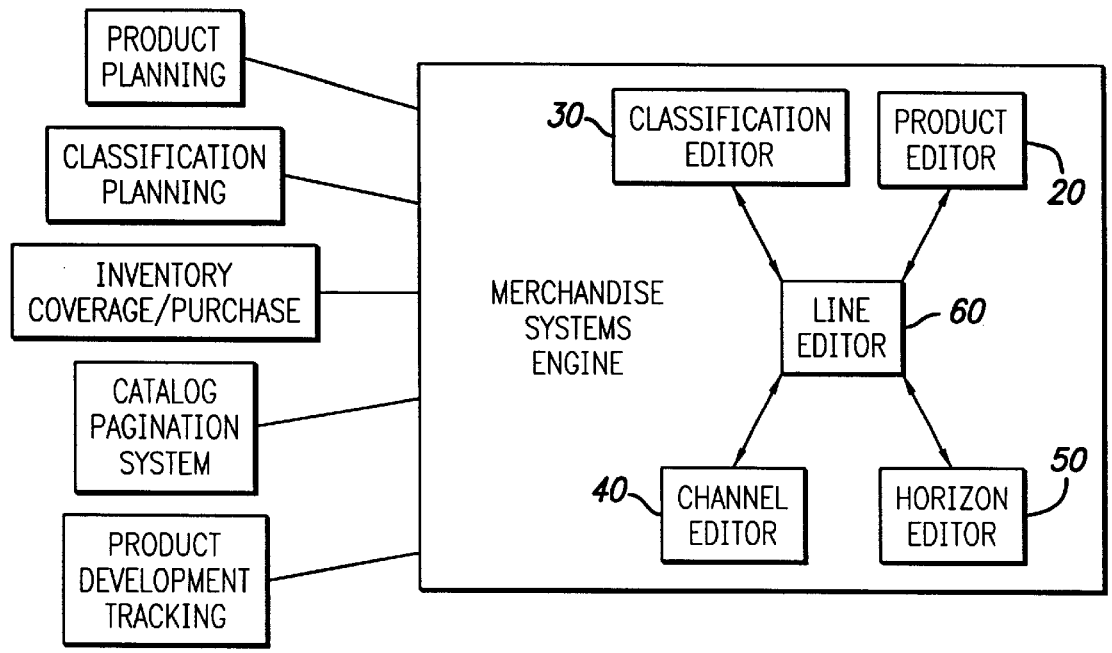
FIG. 3 is a block diagram showing use of the merchandising system engine used in conjunction with inventory related applications.

Referring now to FIG. 2a, a computer system 11 on which the present invention may be implemented is shown. Computer system 11 may be provided, for example, as an IBM® compatible computer or an equivalent computer system running a Windows® based operating environment or other graphical user interface. The exemplary computer system 11 of FIGS. 2a–2b is for descriptive purposes only. Although the description may refer to terms commonly used in describing particular computer systems, the description and concepts equally apply to other systems, including systems having architectures dissimilar to the ones shown in FIGS. 2a–2b.

Computer system 11 includes a central processing unit (CPU) 12, which may be provided, for example, as a conventional microprocessor, a random access memory (RAM) 14 for temporary storage of information, and a read only memory (ROM) 16 for permanent storage of information. Each of the aforementioned components are coupled to a bus 20. Operation of computer system 11 is generally controlled and coordinated by operating system software. The operating system controls allocation of system resources and performs tasks such as processing, scheduling, memory management, networking, and I/O services, among things. Thus, an operating system resident in system memory and running on CPU 12 coordinates the operation of the other elements of computer system 11.

Also coupled to bus 20 is a non-volatile mass storage device which may be provided as a diskette 22. Diskette 22 is insertable into a diskette drive 24 which is, in turn, coupled to bus 20 by a controller 26. Similarly, a compact disc (CD) ROM 28 is insertable into a CD ROM drive 30 which is, in turn, coupled to bus 20 by a controller 28. A hard disk 34 is typically provided as part of a fixed disk drive 36 which is coupled to bus 20 by a disk controller 38.

Data and software may be provided to and extracted from computer system 11 via removable storage media such as a diskette and/or a CD ROM (not shown), collectively "the media." For example, data values inputted and generated using techniques to be described below in conjunction with FIGS. 2a–9 may be stored on storage media similar to the diskette or CD ROM. The data values may then be retrieved from the media by CPU 12 and utilized by CPU 12 to perform color printing of scanned images. Alternatively, CPU 12 may simply store such data values in ROM 16. Alternatively still, computer software useful for calibrating color scanning and color printing peripherals may be stored on storage media similar to media 22, 28. Such computer software may be retrieved from the media for immediate execution by CPU 12. CPU 12 may retrieve the computer software and subsequently store the software in RAM 14 or ROM 16 for later execution.

User input to computer system 11 may be provided by a number of devices. For example, a keyboard 40 and a mouse 42 are coupled to bus 20 by a controller 44. A scanner 46 which may be provided, for example, as a hand held scanner or a page scanner is coupled to bus 20.

Referring to FIG. 2b, the computer system 11 is shown in an exemplary client/server configuration. It is contemplated that the present invention may be implemented in such a client/server configuration or other similar network configuration. The client/server configuration includes a server 46 has a plurality of nodes 47 on which reside terminals 11 or personal computers such as described above. The server 46 may be a computer system as described above or a mini or mainframe type. The client/server configuration may be implemented via direct connect cabling 48 such as twisted pair, coaxial, or other similar connection. The client/server configuration may also be implemented by dial-up or remote access 49 with the terminal or PCs being able to remotely connect to the server 46.

In an exemplary embodiment, the method and apparatus as described herein is implemented using standard object oriented development tools such as Microsoft®'s Visual C++, Visual Basic, Visual Foxpro, Visual J++Interdev, or other similar development tools. Data as provided herein can be implemented in a standard database environment such as SQL server or other similar Open Database Connectivity (ODBC) database environment.

Referring to FIGS. 1–4, in an exemplary embodiment, all product information is inputted initially through the product editor 20, selected through the product menu 22. The menus may be implemented using a standard pull-down type with nesting sub-menus or other similar menu structure as is known in the art. The menus may be presented in a standard windowing type environment/user interface as is known to those skilled in the art. Information such as products, subproduct types, colors, palettes, palette colors, patterns, pattern colorways and colorway colors, sizes, size scales and size ranges, dimension, dimension scales and dimension ranges that any product can be established through the product editor 20. The product editor 20 stores the means to build stock-keeping-units (sku) through the gathering of fundamental information at the point of determination. It is well known by those skilled in the art that skus are the foundation of all future product information.

Figure 4:
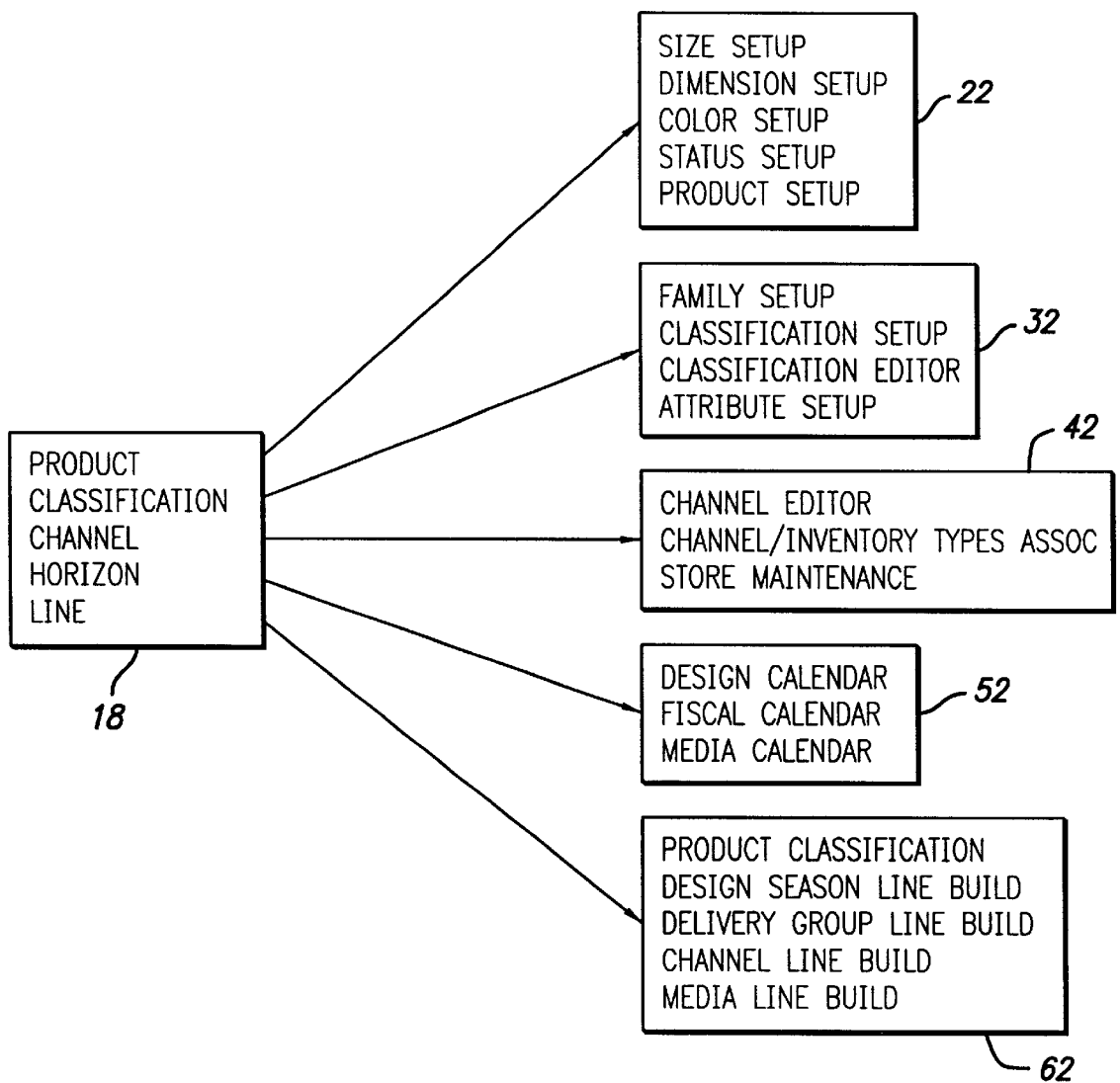
FIG. 4 is a sample menu structure of the merchandising system engine of the present invention.

As shown in FIG. 4, the classification editor 30, channel editor 40 and the horizon editor 50, respectively, follow the product editor 20 and, in an exemplary embodiment, are intended to be accessed in that general order. In an exemplary implementation of the present invention, the classification editor 30, channel editor 40 and the horizon editor 50 have basic classification, channel and horizon information pre-inputted in the respective editors. For example, some basic merchandise classifications such as "mens" and "womens" are established in the classification editor 30 before the product information can be entered. Certain distribution channels such as retail, wholesale, Internet and mail-order and horizons such as design season and media season are also pre-established.

The classification editor 30 through the classification menu 32 allows the user to create unlimited hierarchial classifications for the products. Some exemplary classifications are "men's", "women's", "children's", "knit", "woven", "top", and "bottom." The number of classifications that can be created are unlimited with unlimited levels of nesting, can be timeless, or bound by a constraint as determined by the user. Some examples of constraints would be a media season or a design season. The timeless versions would be applied whenever historical seasons of data are to be compared and contrasted. Also associated with the classification editor, is a product attribute management application that permits unlimited attributes of products to be established and associated to the product through a mutual association with a classification. Among these things, this product attribute management application allows for the creation of different responsibilities within the organization and those employees that fill the given responsibility and as such, is used to filter work efforts by functional area.

The distribution channel editor 40 through the channel menu 42 allows the user to hierarchically recognize the brand distribution channels through which the product will be sold. For example, the distribution channels may be retail, wholesale, Internet and mail order. Other examples of distribution channels include mail order; full price and off price, retail; full price and off price and conceivably down to the retail store catalog mailing list levels.

The horizon editor 50 through the horizon menu 52 allows the user to establish different horizons over which product business will be planned or gauged. For example, horizons may be: fiscal; seasons, quarters and periods-design, seasons and calendar; years, months, weeks and days and media seasons.

In an exemplary embodiment, the line editor 60 accessed through the line menu 62 links the other editors and provides the user an easy, logical environment in which to produce product line lists. The line editor 60 provides the means to identify, establish and report the product, their colors, sizes and dimensions that represent the merchandising collections sold during specific periods of time, or through specific catalogs at any combined level of classification and/or channel hierarchy. For example, in one possible scenario, if a timeless classification is used, historical comparisons with variance reporting for unlimited years of past histories also become available through use of associated applications. The line editor is also adapted to produce reports that demonstrate potential impact of future development plans down to the individual within the product management staff. Through the line editor 60, the foundation is set for the a user to plan its business, develop its product, and execute the objectives through related merchandising applications.

Figure 5:
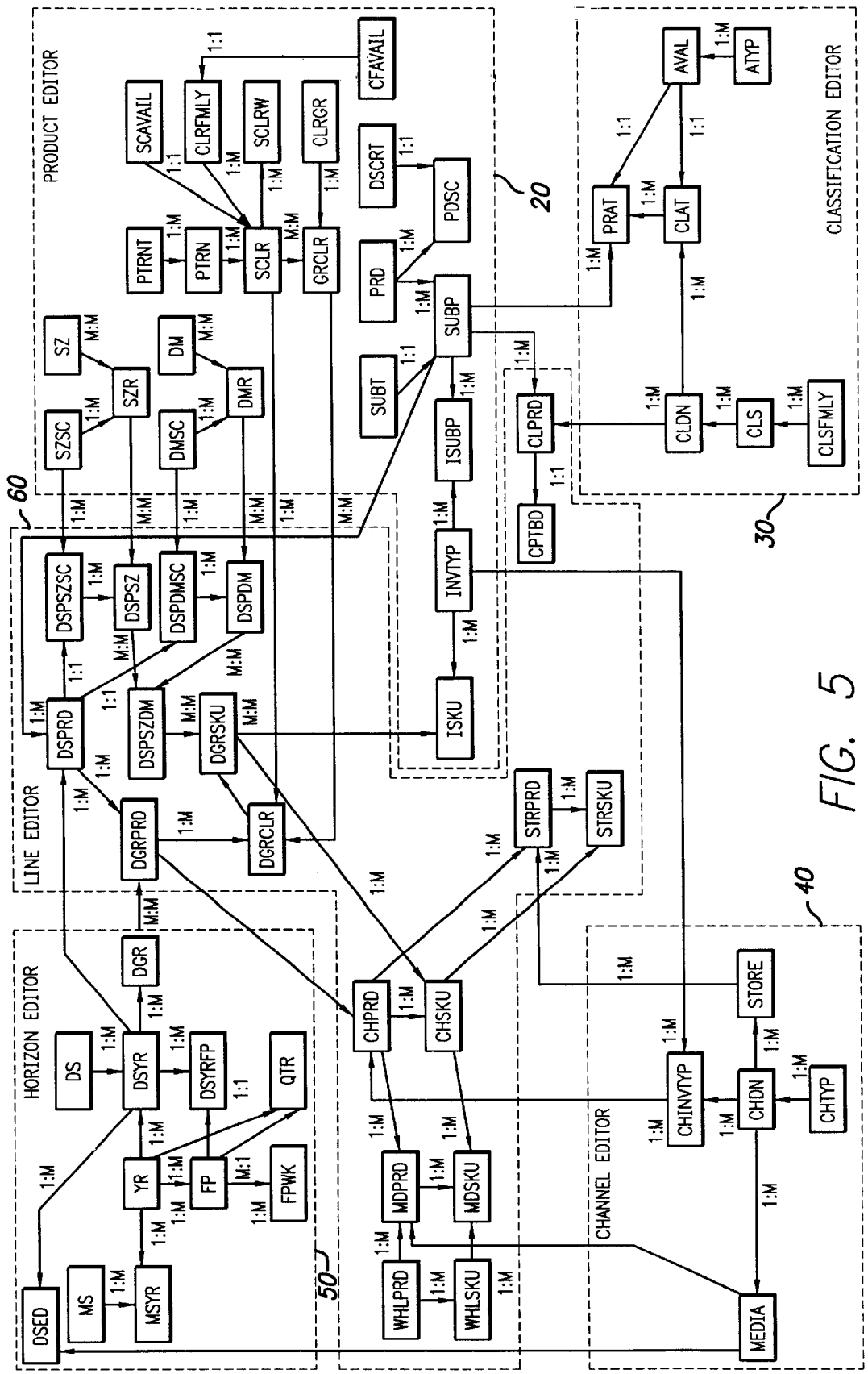
FIG. 5 is an overview block diagram of the table structure of the merchandising system.

In the present invention, each of the editors are organized as a series of interrelated tables. The tables may be either populated with data by the user as in the case of the product editor, or at times, the tables may be already populated with existing data or records as discussed above. Pre-constructed tables may also be user modifiable. An exemplary table structure for the editors is shown in FIG. 5. Other table structures and relationships are possible to accomplish the purpose of the present invention. As can be seen in FIGS. 5–10, the product editor 20, the classification editor 30, the channel editor 40 and the horizon editor 50 are all linked through line editor 60. A detailed discussion of each editor now follows.

The arrows connecting the tables show how the tables are interrelated. The tables may be stored as separate tables or files or preferably, each editor is stored as one large tables with a number of subtables mapped within the main table. While the arrows typically point in the direction of a "parent" table to a related "child" table, the relationship can be assumed to be bidirectional. The ratios, such as 1:1, 1:M, M:1 and M:M, where "M" means "many", represent the ratio of values of one table to another. For example, in the case of a 1:M relationship, one value in a first table will correspond to many values in a second table. The term "link" as used herein refers to an association or relationship between tables, as discussed in more detail herein.

PRODUCT EDITOR

Figure 6:
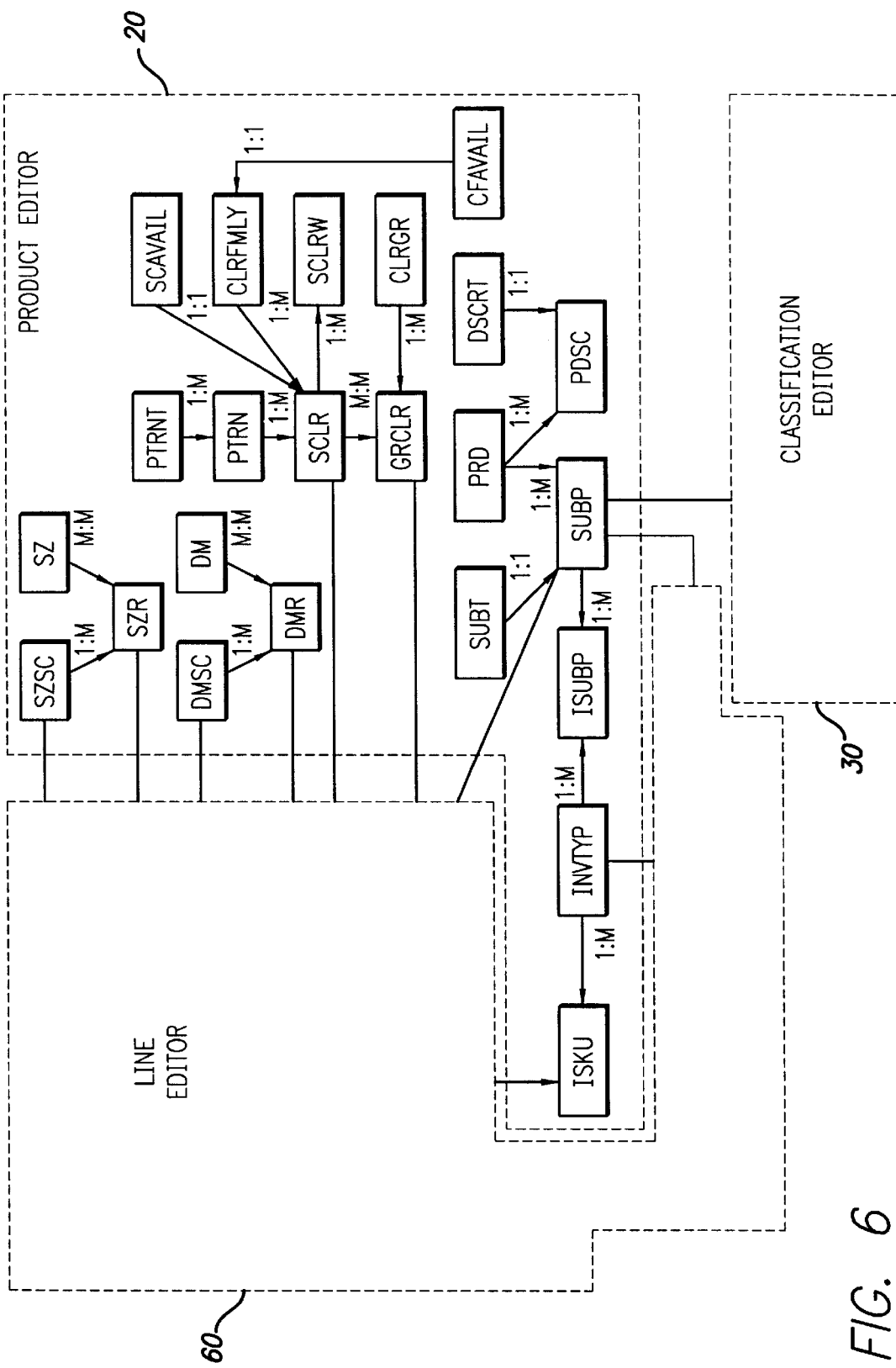
FIG. 6 is a block diagram of the table structure of the product editor portion of the merchandising system engine.

Referring to FIG. 6, an exemplary table relationship diagram for the product editor 20 is shown. In an exemplary embodiment, the user begins with the inputting of basic product information such as sizes, dimensions, colors, etc. that any product may be offered in. Input may be accomplished through use of an input device, such as a keyboard 40 or mouse 42, as discussed earlier herein. This information is provided and stored in a series of tables as described below. In an exemplary embodiment, the majority of product information is provided by the user but in alternative embodiment, at least a portion of the information may already be present in the merchandising system.

A discussion of the product editor 20 tables now follows. As shown in FIG. 6, the SZ or SIZE table contains typical size data such as "Small, Medium and Large." The SZSC or SIZE SCALE table contains header records that reference multiple sizes, e.g. "One Size" or "S, M, L". The SZ and SZSC tables are both linked to the SZR or SIZE RANGE table which associates both the SIZE and SIZE SCALE data. For example, in one embodiment the SIZE SCALE of "Men's Pant" may be associated with SIZES of 26, 28, 30 and 32. The SZSC and SZR tables are then linked to the Line Editor. In an exemplary embodiment, linking can be accomplished as shown by the following code: (Code Excerpted from the Line Editor using an exemplary menu selection of "Design Season Line Build".)

```
IF !empty(This.Value) AND ThisForm.GetMode( ) <
   >'DEFAULT'
*
* Update the C_Available & C_Selected
*
lcSizeScale=C_SZSC.szscfk
SELECT SZR.szr_szfk AS szfk, SZ.sz_name AS
   szName;
FROM SZR INNER JOIN SZ ON SZR.szr_szfk=
   SZ.sz_pk;
```

```
WHERE SZR.szr_szscfk=lcSizeScale;
ORDER BY SZR.szr_order;
INTO CURSOR c_szr
SELECT C_AVAILABLE
ZAP
APPEND FROM dbf('C_SZR')
* Enable the Push Button for Adding
IF !eof( )
   This.Parent.Ctrjpmover1.cmdMove.Enabled=.T.
   This.Parent.Ctrjpmover1.cmdMoveAll.Enabled=.T.
ENDIF
SELECT C_SELECTED
ZAP
*
* Update the V_13 DSPSZSC
*
SELECT V_DSPSZSC
IF reccount( )=0
   INSERT INTO V_DSPSZSC (DSPSZSC_dsyrFK,
      DSPSZSC_prdFK,
DSPSZSC_subpFK);
VALUES (ThisForm.icDssn, C_DSPSZ.prdFK,
C_DSPSZ.subpFK)
   ENDIF
   REPLACE V_DSPSZSC.dspszsc_szscfk WITH
      C_SZSC.szscfk,;
      V_DSPSZSC.szsc_name          WITH
         C_SZSC.szscName
   *
   * Update the mover:
   *
   This.Parent.Ctrjpmover1.updatemoveronnew( )
   ENDIF
```

The following code sample operates to first retrieve all the available size range records from the Size Range table (SZR). The records are placed into a temporary file and the user then selects an appropriate Size Scale (SZSC). Based on the Size Scale the user has selected, an update of both the user's "view" and the table is performed. As used herein the term "view" relates to a "snapshot" or a portion of an entire table which is currently being modified and/or updated. An updating of the user's view typically includes an actual updating of the table's records.

Similar to the SZSC, SZ and SZR tables, the DM or DIMENSION table contains all appropriate dimensions for products. All dimensions are recognized in this table, such as: 31" inseam, 32" inseam, 33" inseam, etc. The DMSC or DIMENSION SCALE are header records that reference multiple dimensions. One example of a dimensional scale would be: Pant Inseams. The DMR or DIMENSION RANGE table contains the relationship of dimensions to dimension scales. Product and dimensions are ultimately associated through the use of this table via the line editor.

In an exemplary embodiment, the color setup of product follows the size and dimension process. The relevant color tables are described below. The CFAVAIL or COLOR FAMILY AVAILABLE table supports the National Retail Federation (NRF) color structure. However, the NRF structure is limiting, in that it allows for only 3 characters. Through use of the CFAVAIL table which references color families, and a detail table, the system may allow for up to 45 thousand unique colors. The CFAVAIL table is linked to the CLRFMLY or COLOR FAMILY table which contains those color families that are in use within the system. When a new family is established, a record within CFAVAIL is flagged as in use. The CLRGR or COLOR GROUP HEADER table contains header records for groups of color. Groups of color are created to allow for faster product color association when multiple product is available in a given "palette" of colors.

The SCAVAIL or SELLING COLOR AVAILABLE table is used in order to support the National Retail Federation (NRF) color standard. It is know by those skilled in the art that the NRF color standard provides for a 3 character color identification. This 3 character identification is typically insufficient, and therefore, in the present invention, the NRF code is assigned a wild card. The wild card allows the system to use through the CFAVAIL table, up to 45 thousand unique colors.

The SCLR or SELLING COLOR table contains all colors, as well as all colors that are developed. While most colors will be referencing fabric, and therefore, the selling color, other colors will be developed for trims etc. thus, needing approval. The SCLRW or SELLING COLORWAY COLORS table is used for those products that use a fabric w/pattern, rather than a solid color, and the fabric is being developed, then all colors w/i the pattern colorway are listed here, thus providing a base for development tracking of each color. The GRCLR or COLOR GROUP DETAIL table contains the actual colors of the color group header record. The PTRN or PATTERN table holds all patterns, through the support of PTRNT or PATTERN TYPE. Each fabric listed in the PTRN table must have a field populated with a value from the PTRN table. For example, a sample record would be "1998 small polka dot tie print pattern". The PTRNT table includes types of patterns listed in this table. Some examples of fabric pattern types would be: knit patterns, woven patterns, printed patterns, etc.

After size, dimension, color setup, the user may proceed to a product setup. The relevant product setup tables are described below. The DSCRT or DESCRIPTION TYPE table allows for each product to have multiple descriptions. Examples of description types would be: Mainframe description type, U.S. Customs description type, Order Entry description type, etc. It is contemplated that the products can have unlimited description type, depending solely on the user's preferences. The DSCRT table is linked to the PDSC or PRODUCT DESCRIPTIONS table. Also linked to the PDSC table is the PRD or PRODUCT table which holds all products. From this table, new products have their code assigned.

The SUBT or SUB PRODUCT TYPE table includes all different sub product types. Some examples of subproduct types might include Base Product, Big and Tall Product, Petite Product, Missy Product, etc. The SUBT and PRD tables are linked to the SUBP or SUB PRODUCT table, which, like the PRD table contain foundation information regardless of selling season. All products in the PRD table have at least one SUBP, that being the base product. Other examples of SUBP categories are: Big/Tall, Petite, etc.

The SUBP table is further linked to the ISUBP or INVENTORY SUB PRODUCT table which contains all unique inventory sub product records. The INVTYP or INVENTORY TYPE table contains header records for the different types of inventory. Some examples of inventory types include first quality, second quality, hemmed, cuffed, etc. The INVTYP table is linked to the ISKU or INVENTORY SKU table which contains all unique inventory skus.

CLASSIFICATION EDITOR

Figure 7:
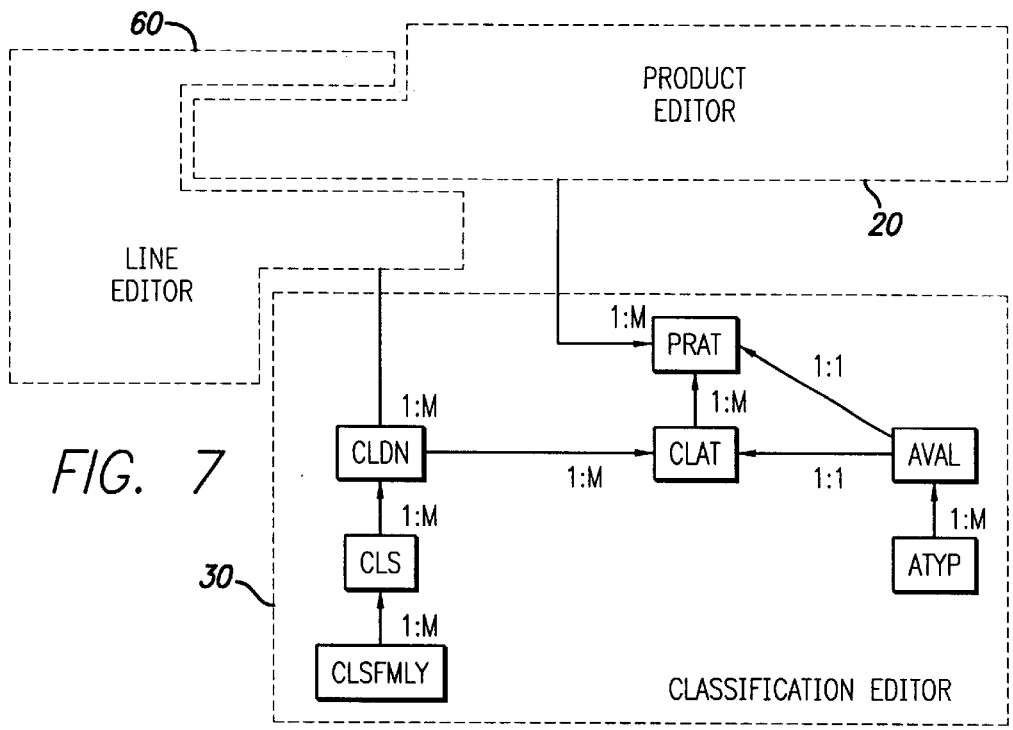
FIG. 7 is a block diagram of the table structure of the classification editor portion of the merchandising system engine.

After the appropriate product information is entered in the Product Editor, the user will enter the Classification Editor to create hierarchies for the products. An exemplary relationship table structure of the Classification Editor is shown in FIG. 7. Typically, the starting point would be the CLS- FMLY or CLASSIFICATION FAMILIES table which contains a record for each family of classifications. The user may then group classifications by department such as merchandising classifications, manufacturing classifications, Robert's classifications, etc. Linked to the CLSFMLY table is the CLS or CLASSIFICATION HEADER table which contains a record for each classification tree. The CLS table is linked to the CLDN or DENORMALIZED CLASSIFICATIONS table which contains all records for every classification in denormal form. As used herein, the term "denormal" application to a concatenated table such as, in this example, the CLDN table which contains all the records for every classification. The CLDN table is then linked to the CLAT or CLASSIFICATION ATTRIBUTE VALUES. In the CLAT table, for the lowest level nodes of any given class, attribute values can be associated. In an exemplary embodiment, a given type of attribute can only be associated with a single class. These records are used for the purpose of speed populating the product attribute table, PRAT, as described below.

The PRAT or PRODUCT ATTRIBUTES table contains the relationships of attributes and their values with each product. The PRAT table can be populated using CLAT, or in an alternate embodiment, the table can be populated individually. If populated using CLAT, then the individual records of each product can be edited within this table. The PRAT table also accepts data from SUBP table in the Product Editor 20.

The ATYP or PRODUCT ATTRIBUTE TYPE table contains attribute type header records such as fabrication, designer, merchant, asst. merchant, etc. The data in the ATYP table will be used in the AVAL or PRODUCT ATTRIBUTE VALUES table to associate values. Some examples of fabrication values in a clothing product context might include woven, machine knit, hand knit, and fur.

CHANNEL EDITOR

Figure 8:
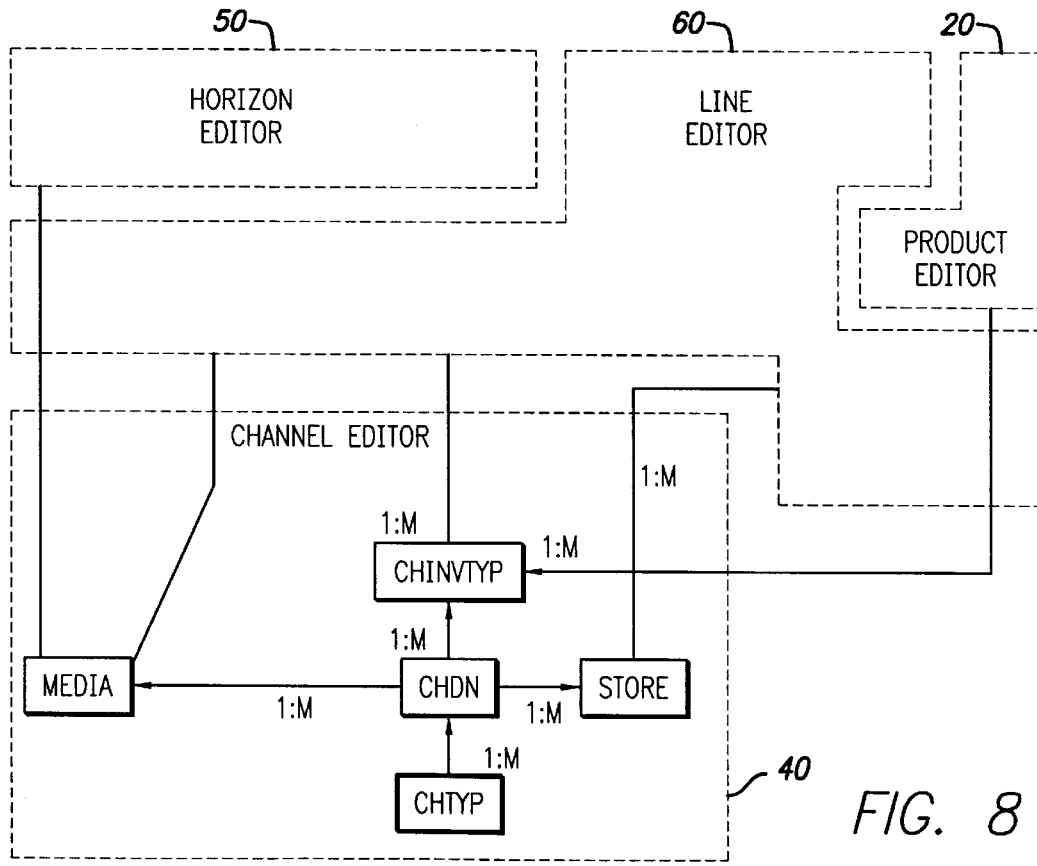
FIG. 8 is a block diagram of the table structure of the channel editor portion of the merchandising system engine.

After information is entered in both the Product Editor and the Classification Editor, the Channel Editor is typically employed to hierarchically recognize the distribution channel through which the product will be sold. Hierarchies are basically unlimited and dependent upon the user's preferences. Some sample hierarchies can include "men's", "women's" and "children's" under which to classify the merchandise. An exemplary table relationship layout is shown in FIG. 8. The relevant channel editor tables are described below.

The CHTYP or CHANNEL TYPE table distinguishes the difference in channel types such as catalog, retail, wholesale, Internet etc. This table is used to determine which class of planning screens, etc. to provide within the different applications. The CHTYP table is linked to the CHDN or DENORMALIZED CHANNEL which contains all branches of the different distribution channels or delta and their relationship to one another with regard to parent, child and/or sibling. Like the CLDN table in the Classification Editor, the CHDN table is in denormal form. The CHDN table is linked to the CHINVTYP, STORE and MEDIA tables. The CHINVTYP or CHANNEL INVENTORY TYPE table relates the inventory type to the different distribution branches within the distribution delta. Some examples include first quality, second quality, hemmed, unhemmed, etc. In an exemplary embodiment, the STORE table contains all retail stores regardless of channel branch, where each store is associated with its channel branch, and where the channel branch is a lowest level node.

The MD or MEDIA table contains all media, regardless of channel branch, where each media is associated with a channel branch and this channel branch is a lowest level node. Exemplary types of media include catalogs, mailers, package inserts, etc. The MEDIA table is further linked the DSED table in the Horizon Editor 50 as discussed in more detail below.

HORIZON EDITOR

Figure 9:
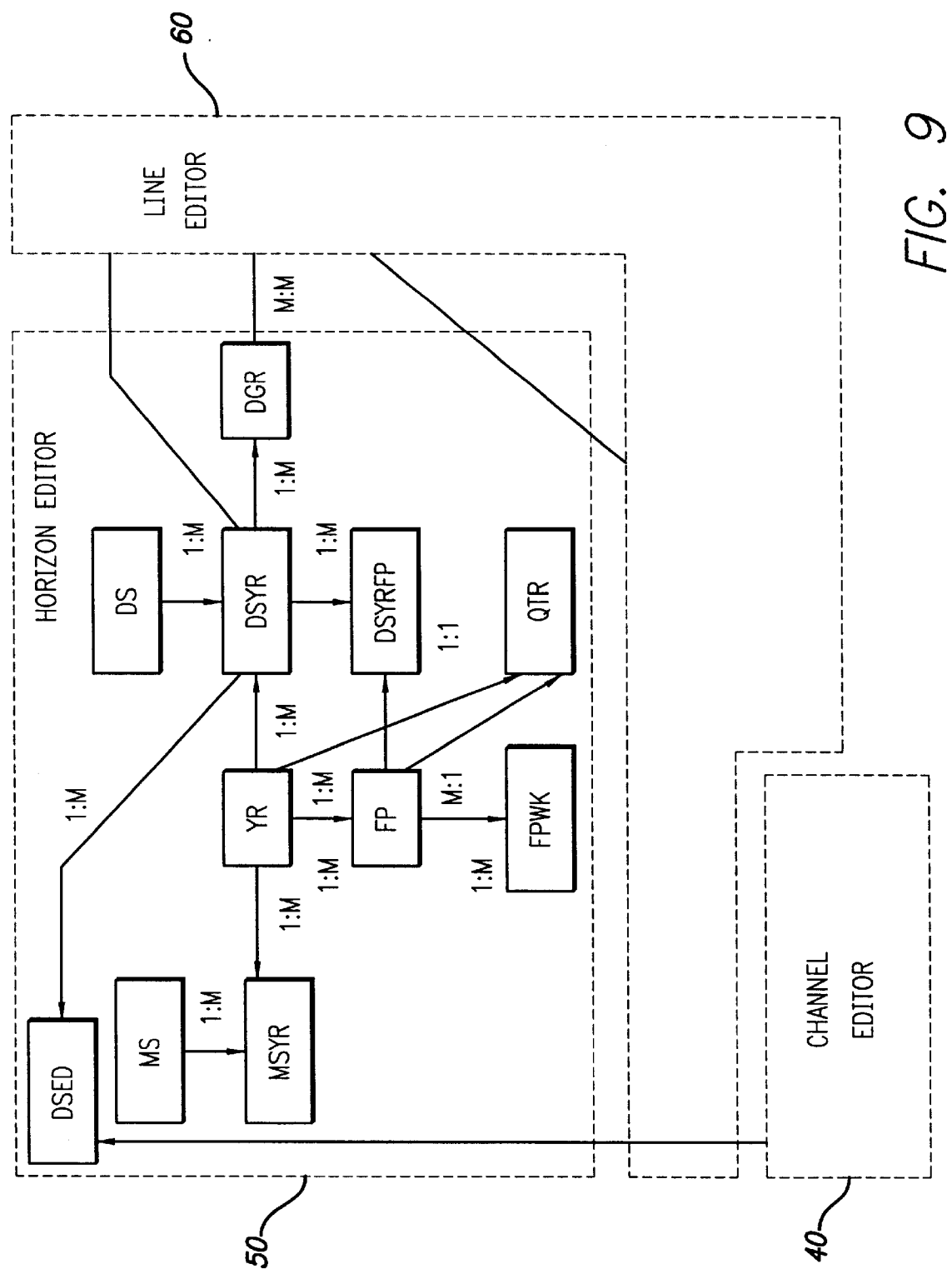
FIG. 9 is a block diagram of the table structure of the horizon editor portion of the merchandising system engine.

After specifying the brand distribution channels in the Channel Editor 40, typically, the user will establish different horizons in the Horizon Editor 50. An exemplary table relationship structure of the Horizon Editor is shown in FIG. 9. The process typically begins with specifying a desired design season. The DS or DESIGN SEASON table contains non year specific design seasons such as: Spring, Fall, Winter, etc. The YR or CALENDAR YEAR table contains simple year listings such as 1998, 1999, etc. In fact, any table in the system that relates elements to years calls on the YR table. The DS and YR tables are linked to the DSYR or DESIGN SEASON YEAR table which associates design seasons to years, ie: Spring '98, Fall '98. These relationships are often referred to as "Design Seasons" as well. The DSYR table is linked to the DGR or DESIGN SEASON DELIVERY GROUP table. The DGR table contains delivery group header records. Delivery groups are subsets of Design Season Years. In an exemplary embodiment, a product is first assigned to a design season, and then to subsequent delivery groups. A design season may also have multiple delivery groups.

The DSYR table is also linked to the DSYRFP and DSED tables. The DSYRFP or DESIGN SEASON YEAR FISCAL PERIOD table associates fiscal periods to design seasons, again, for the use of constructing horizons within the retail planning applications. The DSED or DESIGN SEASON EDITIONS table contains the media types for each design season or DS. The system allows each design season to be offered in unlimited media, and conversely, each media can have unlimited design seasons. These DSED records may be used for the estimation of horizons within the planning browse arrays.

The YR table is linked to the FP or FISCAL PERIOD table which contains the beginning and ending dates of fiscal periods, as well as the fiscal years that they belong to. In an exemplary embodiment, the horizon editor requires that all fiscal periods comprise whole weeks. The FP table is linked to the FPWK or FISCAL PERIOD WEEKS table, where the fiscal periods are broken down into weeks. The FP table is linked to the QTR or FISCAL QUARTER table which contains first and last fiscal periods of the fiscal quarters.

Typically, after the Design and Fiscal calendars are created, the user will specify the media calendar. The MS or MEDIA SEASON table, as with the Design Season tables, contains all media seasons without regard to year, ie: Spring, Fall. The MS table is linked to the MSYR or MEDIA SEASON YEAR table which relates media seasons to the years. As with design season years, often these records are called media seasons. Usually when this term is used, it is these records that are being referenced.

LINE EDITOR

Figure 10:
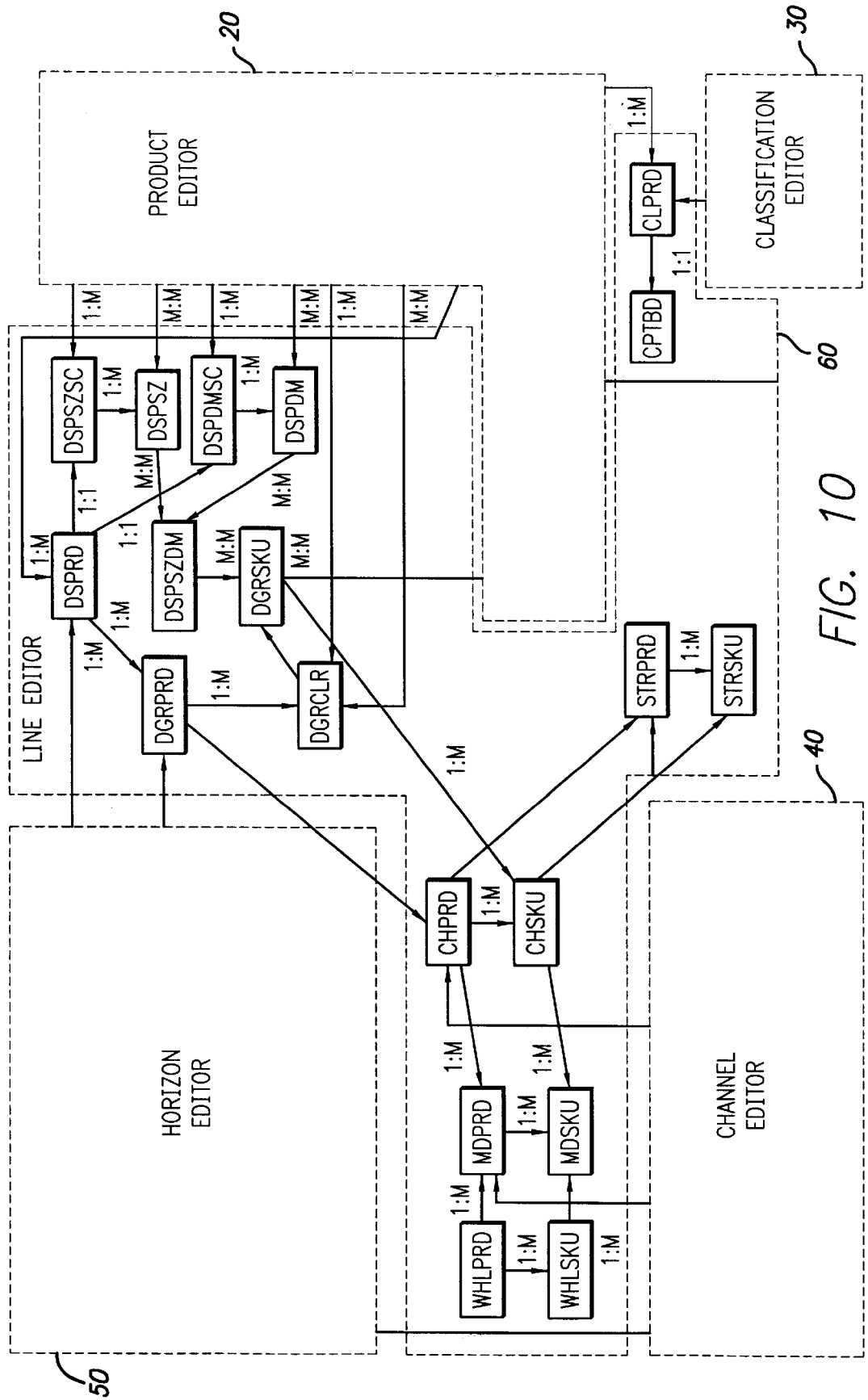
FIG. 10 is a block diagram of the table structure of the line editor portion of the merchandising system engine.

After information is inputted, organized and selected in the product, classification, channel and horizon editors, a user will typically enter the line editor to build line lists. An exemplary table structure of the line editor is shown in FIG. 10. An explanation of the various tables in the line editor now follows.

The DSPRD or DESIGN SEASON PRODUCT contains all product offered in every design season. The DSPRD table is linked to the DSPSZSC, DSPSZDM and DGRPRD tables. The DSPRD table is further associated with and can obtain data from the DSYR table in the Horizon Editor 50 and the SUBP table in the Product Editor 20. The DSPSZSC or DESIGN SEASON PRODUCT SIZE SCALE contains all product size scales for every offering of every design season. The DSPSZSC table is linked to the SZSC table in the Product Editor. The DSPSZ or DESIGN SEASON PRODUCT SIZES contains all product sizes offered in every design season. The DSPSZ table accepts data or is populated from the SZR table in the Product Editor 20. The DSPDMSC or DESIGN SEASON PRODUCT DIMENSION SCALE contains all product dimension scales that product is to be offered in for every design season. The DSPDMSC table is linked to the DSPDM table. The DSPDMSC table also accepts data from the DMSC table in the Product Editor 20. The DSPDM or DESIGN SEASON PRODUCT DIMENSIONS contains all product dimensions offered in every design season. The DSPDM table accepts data from the DMR table in the Product Editor 20. The DSPDM table is linked to the DSPSZDM table. The DSPSZDM or DESIGN SEASON PRODUCT SIZE/DIMENSION table contains all product size/dimension relationships that are offered for every design season.

The DSPSZDM is linked to the DGRSKU table. The DGRSKU or DELIVERY GROUP SKU table contains all delivery group skus for all product being offered in every delivery group. The DGRSKU table is linked to the CHSKU table and the ISKU table in the Product Editor 20 and also accepts data from the DGRCLR table. The DGRPRD or DELIVERY GROUP PRODUCTS table contains all products that are being offered for every delivery group. The DGRPRD table is linked to the DGRCLR and CHPRD tables. The DGRPRD table also accepts data from the DGR table in the Horizon Editor 50. The DGRCLR or DELIVERY GROUP COLORS contains all delivery group product color that are developed for the given delivery group. The DGRCLR table accepts data from the SCLR and GRCLR table in the Product Editor 20.

The CHPRD (alternatively CHNPRD) or CHANNEL PRODUCT table contains all product being offered by each level of the distribution channel. The CHPRD table is linked to the CHSKU, MDPRD and STRPRD tables. The CHPRD table accepts data from the CHINVTYP table in the Channel Editor 40. The CHSKU (alternatively CHNSKU) or CHANNEL PRODUCT SKU table contains all product skus offered by each level of the distribution channel.

Although not shown, the following tables may also be implemented for use in the present invention. The CHNCLR or CHANNEL PRODUCT COLORS may contain all product colors for every channel record. The CHNSZ or CHANNEL PRODUCT SIZES may contain all product sizes offered for each level of the distribution channel.

The STRCLR or STORE PRODUCT COLOR table, not shown, contains all product colors for every store. The STRPRD or STORE PRODUCT table contains all products for every store. The STRPRD table is linked to the STRSKU table. The STRSKU or STORE SKU contains all product skus for each store. The STRSZ or STORE PRODUCT SIZES contains all product sizes for every store.

The MDCLR or MEDIA PRODUCT COLOR table, not shown, contains all product colors for every media offering (catalog, etc.) The MDPRD or MEDIA PRODUCT table contains all product for every media offering (catalog, etc.). The MDPRD table is linked to the CHPRD, CHSKU, WHLPRD and the WHLSKU tables. The MDPRD table is linked to the MDSKU table and accepts data from the MEDIA table in the Channel Editor 40. The MDSKU or MEDIA PRODUCT SKU table contains all product skus for every media offering (catalog, etc.). The MDSZ or MEDIA PRODUCT SIZE table contains all product skus for each media offering (catalog, etc.). The CLPRD or CLASSIFIED PRODUCT table contains all classified product records. This table is seasonless, and contains records for all classifications. The CPTBD table is a "dummy" table and can be later used.

The WHLPRD or WHOLESALE PRODUCT table contains all product for a wholesale offering. The WHLPRD table is linked to the WHLSKU table. The WHLSKU or WHOLESALE PRODUCT SKU table contains all product skus for every wholesale offering.

The method, apparatus and system as described herein is designed to work with any number of related inventory applications, e.g. product planning, classification planning, inventory coverage/purchase, catalog pagination, and product development. The "engine" is portable to any number of different applications and can be modified for different channels of trade. The objective of the engine is to capture all relevant fundamental information that is required for the applications associated to operate properly and in concert with each other.

In an exemplary embodiment of the present invention utilizing the merchandise data engine, merchandise planning is performed on two basic levels: (1) Product Planning and (2) Classification Planning. On the product planning level, merchandise planning is performed all the way down to the individual product unit. On the classification planning level, merchandise planning is entered against the preexisting classification structure. A short description of each application follows.

The product planning system allows for any product line, or subset of a product line, to be planned in tandem via multiple horizons. Through the line editor all of the information required to make the horizontal axis (horizon such as Fall '98, Winter '98, etc.) convertible based on the horizon selected, and the vertical axis (classification such as Men's, Women's, etc.) flexible through line filtering is provided. Several indices are available that will assist the user in the task of planning product catalog demand, or retail store sales forecasts. These indices provide insight into how individual product plans stand up against constraints such as paper and postage costs, original and maintained markup, seasonality, business share, and productivity measures such as sell through, and square foot sales. The planning process is designed to capture plans using units, dollars, share, and average item, while also gathering space allocation, shelf space, and color and size spreads. Depending on the channel of distribution that is being planned, the planning horizon is identified for a given line segment and the plans are loaded in a logical way. Once the period of time that has been planned becomes active, actual results are measured against plan with many variances provided.

The classification planning system may provide a user with the means to build line budgets through the use of historical product information. These line budgets can be made for any horizon, and for any combined level of classification and/or channel hierarchy. In addition to units, dollars, square foot sales and catalog space, a budget can be established for style, item, colors, size and sku counts. As the product planning system starts to produce results, the classification planning system provides the means to measure against budget. As plans become live, the classification planning system provides the means to constantly adjust desired inventory position through compare and contrast of actual business to date, and provides the associated capping and scaling functionality vital to calibrate anticipation of future trends based on current information.

The inventory coverage and purchase system controls the inventory position of a brand through a three step process. First, the system converts all plans regardless of channel into fiscal period needs. Second, it takes into account available inventory to fill future business plans. Third, it calculates exactly what to purchase of a product such that each order maps perfectly to the requirement at sku level out to a defined date which is chosen, using the most current information; and executes the purchase order. Additionally, this system provides the means to manage warehouse capacity, inventory cash flow requirements and early warning and planning for the liquidation of overstocks.

The catalog pagination system allows for preliminary paginations to be performed to determine the best fiscal mix of products to each spread of a catalog. It also captures all relevant presentation directives, featured color, stack order, on-figure color, on-figure sex, etc. that need to be considered prior to the creative effort. For example, if the merchandise plan calls for a blue item to appear on top of the catalog stock, this information can be used to present the product, and this allows for inventory and editorial divisions to plan together in order to achieve better fill rates and reduce overstocks.

As the product management team moves concept styles into development the product development tracking system takes over and reports against calendar how the approval process is fairing. With time to market a critical element in the pursuit of plan, this system provides exception reporting for decisions that are due currently and in the future, as well as for those that are past due. Elements that may be tracked include color lab dips and finish approvals on fabrics, findings and trim, as well as fit, photo and production sample approvals for the garments.

It is therefore understood that, within the scope of the appended claims, the present invention may be practiced otherwise than as specifically described hereinabove. All references cited herein are expressly incorporated by reference in their entirety.

What is claimed is:

1. A database software system operating on a computer system for creating and managing merchandising data for a plurality of product lines sold through a plurality of sales channels, the software system comprising:

a product editor including means for accepting product data relating to a plurality of product characteristics and having a plurality of database tables representing a product characteristic hierarchy, the product characteristic hierarchy being updated by the product editor in response to new data relating to product characteristics;

a channel editor including means for accepting channel data relating to brand and sales channel information and having a plurality of database tables representing a channel hierarchy, the channel hierarchy being updated by the product editor in response to a new data relating to brand and sales channel information; and a line editor for automatically building a product line list, the line editor including means for accepting input data representing relationships between product data and channel data, means for querying the database tables of the product editor and the channel editor, and a plurality of database tables representing the product line list, the product line list being automatically updated by the line editor in response to new data representing relationships between product data and channel data, new product data or new channel data;

the product line list being linked to product and channel data to establish a data foundation for merchandising applications to plan and report on product lines sold across a plurality of channels.

2. The database system of claim 1, further comprising a horizon editor including means for accepting time horizon data relating to the time horizon for a product or brand.

3. The database system of claim 2, wherein the horizon editor further includes means for associating time horizons with seasons.

4. The database system of claim 2, wherein the horizon editor further includes means for accepting delivery group data for a product or brand.

5. The database system of claim 2, further comprising a product planning application for planning and reporting product line forecasts through different channels.

6. The database system of claim 5, further comprising an inventory coverage application, the inventory coverage application considering present inventory and converting plans into product needs to calculate purchasing requirements at a stock-keeping-unit level.

7. The database system of claim 1, further comprising a classification editor including means for assigning classification hierarchies to products.

8. The database system of claim 7, wherein the means for assigning classification hierarchies to products includes a denormalized classifications database table having all records for every classification in the classification heirarchy.

9. The database system of claim 7, wherein the means for assigning classification hierarchies to products includes a classification attributes table wherein individual product attributes are associated with the lowest level node for each classification.

10. The database system of claim 9, wherein the means for assigning classification hierarchies to products includes a product attributes table that is populated from the classification attributes table to relate product attribute values with products.

11. The database system of claim 7, further comprising a classification planning application for building and reporting product line budgets.

12. The database system of claim 1, wherein the line editor includes a graphical user interface to allow a system user to enter data representing relationships between product data and channel data.

13. The database system of claim 1, wherein the channels include retail, Internet, and mail order.

14. The database system of claim 13, wherein the channels further include wholesale.

15. The database system of claim 1, wherein the channels include at least one selected from the group consisting of: individual retail stores and individual mailing lists.

16. The database system of claim 1, wherein the channel editor includes a denormalized channel database table including each branch of each channel.

17. A database software system operating on a computer system for creating and managing merchandising data for a plurality of product lines sold through a plurality of sales channels, the software system comprising:

a product editor including means for accepting product data relating to a plurality of product characteristics and having a plurality of database tables representing a product characteristic hierarchy, the product characteristic hierarchy being updated by the product editor in response to new data relating to product characteristics;

a classification editor including means for assigning classification hierarchies to products;

a channel editor including means for accepting channel data relating to brand and sales channel information and having a plurality of database tables representing a channel hierarchy, the channel hierarchy being updated by the product editor in response to new data relating to brand and sales channel information;

a horizon editor including means for accepting time horizon data relating to the time horizon for a product or brand;

a line editor for automatically building a product line, the line editor including means for accepting input data representing relationships between product data and channel data, means for querying the database tables of the product editor and the channel editor, and a plurality of database tables representing the product line list, the product line list being automatically updated by the line editor in response to new data representing relationships between product data and channel data, new product data or new channel data, the product line list being linked to product and channel data to establish a data foundation for merchandising applications to plan and report on product lines sold across a plurality of channels;

a product planning application for planning product line forecasts through different channels;

a classification planning application for building product line budgets; and an inventory coverage application, the inventory coverage application considering present inventory and converting plans into product needs to calculate purchasing requirements at a stock-keeping-unit level.

18. A computer readable medium having computer readable code for directing a computer system to create and manage merchandising data for a plurality of product lines sold through a plurality of sales channels, the computer readable code comprising:

a product editor means for accepting product data relating to a plurality of product characteristics and having a plurality of database tables representing a product characteristic hierarchy, the product characteristic hierarchy being updated by the product editor in response to new data relating to product characteristics;

a channel editor means for accepting channel data relating to brand and sales channel information and having a plurality of database tables representing a channel hierarchy, the channel hierarchy being updated by the product editor in response to new data relating to brand and sales channel information; and a line editor means for automatically building a product line and for accepting input data representing relationships between product data and channel data, means for querying the database tables of the product editor and the channel editor, and a plurality of database tables representing the product line list, the product line list being automatically updated by the line editor in response to new data representing relationships between product data and channel data, new product data or new channel data;

the product line list being linked to product and channel data to establish a data foundation for merchandising applications to plan and report on product lines sold across a plurality of channels.

19. The computer readable medium of claim 18, wherein the computer readable code further comprises a horizon editor means for accepting time horizon data relating to the time horizon for a product or brand.

20. The computer readable medium of claim 18, wherein the computer readable code further comprises a classification editor including means for assigning classification hierarchies.

* * * * *